United States Patent [19]  [11]  4,156,032
Kluge et al.  [45]  May 22, 1979

[54] PROCESS FOR THE PREPARATION OF POTATO PUREE IN FLAKE FORM AND PRODUCT THEREOF

[75] Inventors: Günter Kluge, Neukeferloh; Karl Petutschnig, Munich; Florence S. Y. Appoldt, Fürstenfeldbruck-Buchenau; Gerhard Seiler, Munich, all of Fed. Rep. of Germany

[73] Assignee: Pfanni-Werk Otto Eckart KG, Munich, Fed. Rep. of Germany

[21] Appl. No.: 846,585

[22] Filed: Oct. 28, 1977

Related U.S. Application Data

[63] Continuation-in-part of Ser. No. 586,212, Jun. 12, 1975, abandoned.

[30] Foreign Application Priority Data

Jun. 14, 1974 [DE] Fed. Rep. of Germany ....... 2428546

[51] Int. Cl.$^2$ ............................................ A23L 1/216
[52] U.S. Cl. ................... 426/637; 426/457; 426/464; 426/654; 426/657

[58] Field of Search ............... 426/637, 654, 456, 457, 426/464, 465, 471, 473, 482, 509, 510, 518, 519, 523, 524, 583, 614, 657

[56] References Cited

U.S. PATENT DOCUMENTS

| | | | |
|---|---|---|---|
| 2,185,451 | 1/1940 | Webb | 426/637 |
| 3,016,303 | 1/1962 | Cooley | 426/464 |
| 3,056,683 | 10/1962 | Cyr | 426/637 |
| 3,163,546 | 12/1964 | Pader | 426/637 |
| 3,493,390 | 2/1970 | Succu | 426/637 X |

OTHER PUBLICATIONS

Webb et al., By-Products From Milk, 1970, pp. 349–352.

*Primary Examiner*—Arthur L. Corbin
*Attorney, Agent, or Firm*—Browdy & Neimark

[57] ABSTRACT

A reconstitutable potato puree in dried flake form is prepared by dispersing in the puree, prior to drying, an aqueous suspension of a water-soluble protein material selected from the group consisting of egg albumin and lactose-poor whey protein.

24 Claims, No Drawings

# PROCESS FOR THE PREPARATION OF POTATO PUREE IN FLAKE FORM AND PRODUCT THEREOF

BACKGROUND OF THE INVENTION

This is a continuation-in-part of copending application Ser. No. 586,212, filed June 12, 1975, now abandoned.

(A) FIELD OF THE INVENTION

This invention relates to the preparation of potato puree in dried form which, when reconstituted, provides potato puree, (i.e. the so-called "instant mashed potatoes").

(B) DESCRIPTION OF THE PRIOR ART

Potato puree in dried form has, for years, been gaining popularity among housewives and in restaurants, particularly due to its advantages, as a "convenience food", in preparing potato puree. Housewives like such product because of the time savings involved; restaurants like it because of the fact that large quantities of potato puree may be easily handled with fewer personnel.

At the present time there are two main types of this product on the market, namely potato powder or granules and potato flakes. The latter are more favored since, in their reconstituted form, due to their fluffy consistency, they are almost identical to a freshly prepared potato puree.

Potato flakes have previously had, on the other hand, the disadvantage that they cannot be reconstituted with milk and/or water at boiling temperature (as can be done with potato granules), since such high temperatures result in an excessive destruction of potato cells. This in turn results in a pasty, sticky mass which can no longer stand up to a comparison with a freshly prepared potato puree. Potato flakes must be prepared into puree using temperatures of 70° to 75° C. In the case of restaurants, this temperature is too low and therefore can lead to the situation where the puree is almost cold by the time it can be consumed. That is the reason that restaurants and canteens often prefer potato granules which may be reconstituted at the boiling temperature of milk and/or water.

In the household kitchen too, there is an advantage in preparing puree from potato flakes at boiling temperature, since it is much easier to boil the liquid needed than to set the temperature to 70°-75° C. as is necessary in the case of potato flakes presently on the market.

Since puree from potato granules or potato flakes is usually prepared by using a mixture consisting of water and milk at a ratio of 2:1, requiring a supply of fresh milk, it is desirable to add milk solids in suitable concentration to the potato granules or potato flakes so that, for reconstitution, only water is needed. It is furthermore desirable to produce a dried potato flake which can be reconstituted, even after prolonged storage, at the boiling temperature of water into puree of acceptable consistency, and which puree still retains the desirable properties of good taste, odor and color.

This problem has been known for some time and the patent literature provides numerous methods suggesting a solution for this problem. German Publication No. 2,138,874 teaches, for instance, the addition of fat, skim milk solids, salt and emulsifiers in order to obtain potato flakes which can be prepared into a puree of good consistency. U.S. Pat. No. 3,447,934 provides a disclosure of the use of emulsifiers consisting of a mixture of monoglycerides and the salt of a lactic acid ester. U.S. Pat. No. 2,980,543 likewise suggests solving the problem by using emulsifiers, if necessary, with the addition of fats. U.S. Pat. No. 3,056,683 shows the basic process of which the present invention is an improvement, and the use of emulsifiers, if necessary in conjunction with fat and methyl cellulose in order to improve the consistency. Further suggestions are described in British Pat. Nos. 1,318,750 and 1,293,527. Further attempts to solve this problem are known from U.S. Pat. Nos. 3,417,483; 3,418,142; 3,355,304; 3,063,849; 3,016,303; and 3,219,464. U.S. Pat. No. 3,163,546 shows the addition of protein to improve adherence of the puree to the drying drum.

SUMMARY OF THE INVENTION

(a) Aims of the Invention

None of the above-mentioned proposed solutions was able to achieve fully satisfactory results and commercial importance, so that the potato flakes presently on the market still cannot be reconstituted at the boiling temperature of water, even after prolonged storage, into a product having good consistency, taste, odor and color. The problem therefore still also exists of producing a potato flake which already includes the necessary milk constituents as well as one which may be reconstituted using boiling water and/or milk in the preparation of the puree.

(b) Statement of Invention

By one broad aspect of this invention, a process is provided for the preparation of potato puree in dried flake form including the steps of washing, peeling, slicing, precooking, cooling and cooking, along the lines of U.S. Pat. No. 3,056,683, the process including the steps which comprise: forming a puree of the cooked potatoes; homogeneously dispersing therein an aqueous suspension of a protein, most preferably a whey protein, which is water soluble in its native state having a solid content of about 9 to about 45% by weight; and drying such mixture.

(c) Other Features of the Invention

Examples of suitable proteins are egg albumin and the albumin- and globulin fractions from milk which together are called whey proteins. Water-soluble vegetable proteins such as soy protein have been found unsatisfactory; egg albumin is superior, but lactose-poor whey protein has been found to be the best additive. The usual effective range of concentration of the protein is from about 2% to about 12%, preferably from about 4% to about 8%, and most preferably 4.5-5%, based on the weight of dry potato solids. Apart from the protein, emulsifiers, for example, monoglycerides and/or stearoyl lactylates, may be used in quantities known from the present status of technique; in particular, however, they may be used in quantities of from about 0.5% to about 5%, preferably 0.6-0.8%, based on the weight of dry potato solids.

Lactalbumins and globulins are derived from whey and are also called whey proteins. Whey proteins are produced either by precipitation from whey, drying and milling to the finest grade, or by ultra filtration of whey, drying of the albumin fractions and subsequent milling to the finest grade. Whey proteins of both types can however also be added in liquid form as a concentrate.

The lactose present in considerable amounts in commercial whey powders (about 71%) and in skim milk powders as well (about 52–54%) can result in undesired bronzing reactions of the type of the Maillard reaction during the drying process on the roll drier. It is therefore beneficial to use lactose-poor whey proteins, which are known and commercially available products (e.g. "Protolac" of Borden, and "Albovin" of Gabler-Saliter). Such lactose-poor whey protein usually contains up to 20–22% lactose, but may contain as much as 25% lactose.

The puree may advantageously be prepared following a process whereby the potatoes are washed, peeled and sliced in a conventional manner. Thereafter, the potato slices are exposed to a temperature treatment, preferably in water, at a temperature ranging from about 45° C. to about 60° C., preferably about 55° C., for a period of about 10 to about 60 minutes, preferably about 20 minutes. The potato slices are then precooked at a temperature of from 65° C. to about 85° C., preferably about 70° C., for a period of from about 5 to about 30 minutes, preferably about 10 minutes. The potatoes are subsequently cooled down in conventional manner and are cooked until done by means of steam under atmospheric pressure and are mashed to a puree. According to the process of an aspect of this invention, the above-mentioned proteins (namely, albumins) as well as emulsifiers and, if necessary, milk solids and spices are added. Then the puree is dried on a roll drier in the usual manner. The beneficial effect of the addition of protein (e.g. albumin) prior to drying however is also achieved if the puree is prepared by any other known process and then is treated by the addition of the protein in accordance with the process of an aspect of this invention.

It is not exactly known which reactions individually are responsible for the improvement in quality. It has, however, surprisingly been found that there is a definite difference in the consistency of an industrially prepared puree prepared from flakes to which, prior to drying, proteins which are water soluble in their undenatured state (such as, for example, egg albumin, or the albumin- and globulin fractions from milk, i.e. whey protein, most preferably lactose-poor whey protein containing no more than 25% lactose) have been added compared to potato flakes which have been produced in accordance with the process of the prior art by reconstituting at boiling temperature. Moreover, the addition of other proteins such as, for example, casein, has no positive influence on the puree, and, indeed, has a detrimental affect on color, odor and taste. It is believed that the addition of proteins, which in their native state are water soluble, alters the starch molecules of a potato puree in such a manner that detrimental characteristics are no longer evident. Only by means of the additives in accordance with the process of an aspect of the present invention is it possible to reconstitute potato flakes using liquids at boiling temperature to obtain a puree of appetizing (i.e. with excellent taste, odor and color), fluffy consistency.

It has been found that it is desirable to add about 2% to about 12% proteins, preferably about 4% to about 8%, based on the weight of dry potato solids, in order to achieve the effect described in the process of an aspect of the invention.

The effect of an improved consistency due to the addition of proteins depends also on their homogeneous dispersion in the puree. Therefore, the additives used in accordance with the process of an aspect of this invention are preferably added to the puree in the form of an aqueous suspension having a solid content of from about 9 to about 45%, appropriately above about 20% and preferably about 40%, immediately after pureeing, by directly spraying into the puree by means of two channel nozzles and by homogeneously mixing by means of carefully operating mixing devices. If whey proteins are used which still contain certain significant quantities of lactose particles, it can sometimes be beneficial to spray the aqueous protein suspension into the sump of the third or fourth downstream application roll respectively of a conventional roll drier comprising five application rolls. In this manner, the occurrence of browning reactions which usually occur between reducing sugars and amino acids at higher temperatures and low moisture contents is, to a large degree, obviated.

Surprisingly, the consistency improving effect of such protein additions is maintained even if whole milk or skim milk are also added to the puree, either in their native condition or in dried form, so that the resulting product merely may be reconstituted with hot water.

If milk is added to the puree in any form, but preferably, however, as an aqueous concentrate having a solid content of approximately about 40%, it is best to do this by spraying it into the sump of the fourth downstream application roll of a conventional roll drier comprising five application rolls, in order to keep the thermal influence on the milk as low as possible, and to minimize, or even to obviate, the browning reactions usually occurring between the lactose and amino acids.

DESCRIPTION OF PREFERRED EMBODIMENTS

The invention in certain of its aspects is described in a more detailed form in the following examples.

All percentages are percentages by weight based on the solid content of the dry potatoes. The evaluations, done by a test panel of five skilled food tasters, have been determined in accordance with the Evaluation Standards set by the Research Institute for the Preservation of Food Stuff in Karlsruhe, the mark 9 describing an ideal product (practically never found), and the mark 1 describing a product unfit for human consumption. A rating as low as 5 in any of the four criteria of color, odor, taste and consistency renders the product as unfit according to the standards of the assignee company.

EXAMPLE 1

Potatoes, type Maritta, having a starch content of 16.5%, were washed, peeled, sliced to a thickness of 10–15mm, precooked for 20 minutes at 70° C., cooled down for 30 minutes with tap water having a temperature of 12° C., cooked with steam for 30 minutes under atmospheric pressure and mashed. 0.6% of monoglyceride emulsifier was mixed in and the puree was dried on a drum drier having five application rolls, once without any additives, and once after the additives listed in Table I had been added.

The flakes thus obtained were reconstituted by means of a mixture consisting of water and milk in a ratio of 2:1 at boiling temperature into a puree and evaluated by means of a sensor. The results are listed in Table I (the tests identified by a letter being comparative tests, while those identified by number being within the scope of aspects of this invention).

comparative tests while those identified by number being within the scope of aspects of this invention).

TABLE II

| Test No. | Protein Type | Protein Added % | Additional Emulsifier Type | Additional Emulsifier Concentrate % | Additional Milk Type | Milk Addition | Evaluation |
|---|---|---|---|---|---|---|---|
| E | — | — | — | — | — | — | 3 |
| F | — | — | Monoglyceride | 1 | Skim | 18 | 4 |
| 15 | Whey protien ultrafiltered | 4 | " | 1 | Skim | 9 | 6 |
| 16 | — | — | " | 1 | Whole | 26 | 4 |
| 17 | Whey protein ultrafiltered | 4 | " | 1 | Whole | 13 | 6 |
| 18 | Whey protein ultrafiltered | 2.6 | " | 1 | Whole | 20 | 7 |
| 19 | Egg albumin | 4 | " | 1 | Whole | 13 | 7 |
| 20 | Soy protein | 4 | " | 1 | Skim | 9 | 7 |
| 21 | Wheat protein | 4 | " | 1 | Skim | 9 | 6 |

TABLE I

| Test No. | Type of Protein | Quantity of Protein Added % | Additional Emulsifier Type | Concentration of Emulsifier | Evaluation |
|---|---|---|---|---|---|
| A | — | — | — | — | 3 |
| B | — | — | Monoglyceride | 2 | 4 |
| C | — | — | " | 4 | 4 |
| D | — | — | " | 10 | 3 |
| 1 | Whey protein | 12 | " | 1 | 6 |
| 2 | Ultra filtered | 8 | " | 1 | 7 |
| 3 | Whey protein | 12 | " | 1 | 6 |
| 4 | Precipitated | 4 | " | 1 | 6 |
| 5 | Whey Protein | 8 | " | 3 | 7 |
| 6 | Curd-Ultra filtered | 12 | " | 1 | 4 |
| 7 | Egg-albumin | 8 | " | 1 | 7 |
| 8 | Egg-albumin | 4 | " | 1 | 8 |
| 9 | Egg-albumin | 2 | " | 1 | 7 |
| 10 | Soy protein | 8 | " | 1 | 7 |
| 11 | Soy protein | 4 | " | 1 | 6 |
| 12 | Soy protein | 2 | " | 1 | 5 |
| 13 | Wheat | 9 | " | 1 | 5 |
| 14 | Wheat | 4.5 | " | 1 | 5 |

EXAMPLE 2

Potatoes of the type Maritta, having a starch content of 16.5% were washed, sliced to a thickness of 10–15 mm, precooked for 20 minutes at 70° C., cooled down for 30 minutes using tap water having a temperature of 12° C., and were then cooked with steam for 30 minutes under atmospheric pressure and mashed to a puree.

0.6% of monoglyceride emulsifier was added and the puree was dried on a drum drier having five application rolls; once without any additives, and once mixed with the additives listed in Table II. Milk was added to the puree in form of concentrates having a solid content of 40%.

The flakes produced without additives were reconstituted with a mixture consisting of water and milk, and the flakes containing additives were reconstituted with water only, at boiling temperature, and the puree was evaluated by means of a sensor. The results were as shown in Table II (the tests identified by a letter being

EXAMPLE 3

In accordance with the processes described in Examples 1 and 2, a puree was prepared from potatoes of the type Maritta, having a starch content of 16.5%. To the puree were added in total 1.6% monoglyceride emulsifier and 10% of whey protein which was obtained by precipitation, as well as the quantities of cystein quoted in Table III. The puree was then dried on a drum drier. The whey protein used had a lactose content of 18%.

The puree obtained by reconstitution of potato flakes with boiling water was kept for four hours at a temperature of 92° C. in a water bath. The color of the puree was evaluated by means of a sensor immediately after reconstitution, after two hours, and after four hours. The results are listed in Table III.

TABLE III

| Test No. | Cystein Addition | Evaluation of Colour After Reconstitution | After 2 Hrs. at 92° C. | After 4 Hrs. at 92° C. |
|---|---|---|---|---|
| 22 | — | 7 | 5 | 4 |
| 23 | 0.05 | 7 | 6 | 5 |
| 24 | 0.1 | 7 | 6 | 5 |
| 25 | 0.2 | 7 | 7 | 6 |

EXAMPLE 4

Example 1 was repeated with potatoes of the type Satura, havig a starch content of 17.2%. The results were essentially the same as in Example 1.

EXAMPLE 5

Example 1 was repeated with potatoes type Kobra, having a starch content of 16.5%. The results of Example 1 were confirmed.

EXAMPLE 6

Example 2 was repeated with potatoes type Bintje, having a starch content of 13%. The results of Example 2 were confirmed.

EXAMPLE 7

Example 2 was repeated with potatoes type Desiree, having a starch content of 15.1%. The results were essentially the same as in Example 2.

EXAMPLE 8

Potatoes of the type Maritta, having a starch content of 16.5% were washed, peeled and sliced to a thickness of 10-15 mm, treated for 20 minutes at 55° C., precooked for 10 minutes at 70° C., cooled down for a period of 30 minutes with tap water having a temperature of 12° C. The potatoes were then cooked with steam under atmospheric pressure for 30 minutes. 0.6% monoglyceride emulsifier was added, and the puree was dried on a drum drier having five application rolls. After reconstitution using a mixture consisting of milk and water at a ratio of 2:1 at boiling temperature, the potato flakes thus produced resulted in a distinctively better quality of puree than the one obtained from flakes produced in accordance with Example 1 without any additives.

EXAMPLE 9

A puree was prepared in accordance with the product described in Example 8, from potatoes of the type Maritta, having a starch content of 16.5%. The puree was mixed with a total of 1.6% monoglyceride emulsifier and the additives listed in Table IV and was dried on a drum drier having five application rolls. The flakes thus obtained were mixed with boiling water to a puree and the same was compared to the comparison sample of Example 1. The results are shown in Table IV (in which the test identified by the letter is a comparative test, and in which those identified by number are tests within aspects of this invention).

TABLE IV

| Test No. | Additive | Concentration % | Evaluation |
| --- | --- | --- | --- |
| G | — | — | 3 |
| 26 | Whey protein ultrafiltered | 4 | 7 |
|  | Egg albumin | 4 |  |
| 27 | Whey protein ultrafiltered | 4 | 6 |
|  | Soy protein | 2 |  |
| 28 | Egg albumin | 4 | 6 |
|  | Wheat protein | 4 |  |
| 29 | Egg albumin | 2 | 6 |
|  | Celatine | 4 |  |
| 30 | Egg albumin | 4 | 7 |
|  | Soy protein | 2 |  |

EXAMPLE 10

In a preferred example, 0.6-0.8% monoglyceride and 4.5-5% lactose-poor whey protein are added to the potato puree prior to drum-drying.

EXAMPLE 11

The following is the description of an experiment in which three sets of tests were conducted to show the effect of lactose-poor whey protein (whey protein which is depleted in lactose and contains a maximum of 20% lactose compared with usually 52-54% in skim milk powder or about 70 to 72% in normal whey powder) on the one hand, and sodium caseinate, skim milk solids and soy protein as shown in the enclosed table, on the other hand.

The protein addition for each sample was 1.2 g per portion finished potato puree, which is about 3.8% based on dry potato solids.

One part of the puree contained no added fat while another part contained 3.8% added fat as according to regulations a potato puree which is sold under the designation "with milk" must contain 1.2 g milk fat per portion (3.6-4%, based on dry potato solids) additionally to 1.2g per portion of milk protein. The purees designated "no fat added" did not contain fat while the purees designated "fat added" contained 3.8% milk fat (butter fat) based on dry potato solids.

The blind sample designated 1334 containing no fat was rehydrated with milk so that the finished puree contained fat and protein according to regulations.

The potato flakes used for all the purees were made from potato brand "Desiree", a potato having a starch content of 13.3%. The flakes were from the ordinary production and were the same for each sample, except for the protein additive.

The rating was done according to "Karlsruher Bewertungschema" (Karlsruhe Evaluation Standard) which is an agreement among German (and other European) potato processors. The highest rating is 9 which is only given to products having ideal properties which are practically never found. According to the standard used at applicant's company in actual production, every hour a sample is drawn and tested. If two successive samples have a rating of 5 in any one of the four criteria rated (color, odor, taste and consistency), the product is discarded as not fit for sale as applicants' company guarantees a rating of 4+ after 18 months storage so that a rating of 5 in one of the criteria for only two hours may be tolerated to guarantee a rating of 4+ after 18 months storage in the product sold to the customer (e.g. housewife).

The whey protein used in test 1338 is a commercial product having at least 70% whey protein, a maximum of 20% lactose, about 7% $H_2O$, the residue being mineral matter naturally occurring in milk.

Also sodium caseinate, skimmed milk protein and soy protein used in the tests were commercial standard products.

The testing was done by a test board of 5 people, who usually test the production of applicants' company.

The following Table V shows that lactose-poor whey protein gives the best results in the starting purees (freshly prepared) as well as after 5 weeks, 64 weeks and 79 weeks, respectively, of forced storage at 20° C., both with and without added butter fat, evaluating all four criteria.

Sodium caseinate renders the purees unfit for use as after 5 weeks storage there is a tendency of the puree to become greyish in color and sour in odor and taste although consistency, which is an important criterium, is as good as in a puree made with milk and having no additionally added protein and fat in the freshly prepared state.

Purees made with skimmed milk solids are somewhat better after 5 weeks of storage, but especially taste and consistency are not very good. After 64 weeks of storage, the product was unsatisfactory.

A puree made with soy protein is just tolerable in the freshly prepared state; however, it is at the lower limit of quality for sale after 5 weeks storage, and after 64 weeks of storage is unsatisfactory.

The puree made with lactose-poor whey protein is the best of all purees and practically keeps its properties also during storage. Even after 79 weeks of storage, its rating is very high.

The test results clearly show that among possible edible proteins which could be used together with potato purees lactose-poor whey protein is a selection showing a surprisingly better effect than the other proteins used in the tests and shown in prior art.

TABLE V

TEST PUREE
Brand of potatoes:

| Test No. | Protein Addition | Starting Test no fat added+ | | | |
|---|---|---|---|---|---|
| | | Color | Odor | Taste | Consistency |
| 1334[1] | — | 6 | 7 | 7 | 6 |
| 1335 | sodium caseinate (88% prot./5% H$_2$O) | 7 | 7 | 7 | 6 |
| 1336 | skimmed milk solids (35% prot./4% H$_2$O) | 7 | 7 | 6(sweetish) | 5 |
| 1337 | soy protein "promine F" (91.5% prot./5% H$_2$O) | 6 | 6 | 6 | 5 |
| 1338 | whey protein[2] (70% prot./7% H$_2$O) | 7 | 7 | 7 | 8 |

The rating was done according to the agreement of Karlsruhe (Karlsruher Bewertungsschema).
9 is highest rate which is only given for ideal products.
+According to regulations a puree designated "with milk" must contain 1.2 g milk fat and 1.2 g milk protein per portion which is about 3.6–4% fat and protein respectively, based on dry potato solids. In the tests designated "fat added" 3.8%, based on potato solids, of milk fat (butter fat) had been added.
[1] 1334 blind test was rehydrated with milk
[2] whey protein (essentially lactalbumine) containing max. 20% lactose (normal lactose contents of skim milk powder is 52–54% lactose, that of whey powder is 70–72% lactose).
All samples were rehydrated at 100° C. Salt was added in the rehydration liquid.

WITH PROTEINS
Desiree, Starch Contents 13.3%
Storage Test (5 weeks temp. = 20° C.)

| Test No. | Color | Odor | Taste | Consistency | | Color | Odor | Taste | Consistency | |
|---|---|---|---|---|---|---|---|---|---|---|
| 1334 | 8 | 7 | 7(slightly sweetish) | 5 | no fat added | 7–8 | 7 | 7 | 5 | fat added |
| 1335 | 7(slightly grey) | 6(slightly sour) | 5(sour) | 5–6 | " | 6 | 6 | 5(sour) | 5–6 | " |
| 1336 | 8 | 7 | 6 | 6 | " | 7 | 7 | 6 | 6 | " |
| 1337 | 5(grey) | 6 | 5 | 5 | " | 5 | 6 | 5 | 6 | " |
| 1338 | 8 | 7 | 7 | 7–8 | " | 7 | 7 | 7 | 7–8 | " |

WITH PROTEINS
Desiree, Starch Contents 13.3%
Ratings of STORAGE TEST after 64 weeks at 20° C.

| Test No. | Color | Odor | Taste | Consistency | |
|---|---|---|---|---|---|
| 1334 | 6 | 6 | 6 | 5 | |
| 1335 | 4 | 4 | 4 | 4 | |
| 1336 | 5 | 4 | 3 | 4 | no fat added |
| 1337 | 4 | 5 | 4 | 5 | |
| 1338 | 7 | 7 | 7 | 7 | |
| 1334 | 6 | 6 | 6 | 5 | |
| 1335 | 4 | 4 | 4 | 5(sticky) | |
| 1336 | 5 | 4 | 3 | 4(sticky) | fat added |
| 1337 | 4 | 5 | 4 | 5 | |
| 1338 | 7 | 7 | 7 | 7 | |

WITH PROTEINS
Desiree, Starch Contents, 13.3%
Ratings of STORAGE TEST after 79 weeks at 20° C.

| Test No. | Color | Odor | Taste | Consistency | |
|---|---|---|---|---|---|
| 1334 | 5 | 5 | 5 | 5 | |
| 1335 | 4 | 4 | 4 | 5[1)] | |
| 1336 | 5 | 4 | 3 | 5[1)] | no fat added |
| 1337 | 4 | 3 | 3 | 4 | |
| 1338 | 6 | 6 | 6 | 7 | |
| 1334 | 5 | 5 | 5 | 6[1)] | |
| 1335 | 4 | 4 | 4 | 5 | |
| 1336 | 5 | 4 | 3 | 5[1)] | fat added |
| 1337 | 4 | 3 | 3 | 4 | |
| 1338 | 6 | 6 | 6 | 7 | |

[1)] The slight improvement of the rating compared to the rating after a 64 weeks storage at 20° C. is apparently due to the retrogradation of starch.

EXAMPLE 12

The following is a description of an experiment in which three tests were conducted to show the effect of whey protein with reduced lactose content on potato puree (lactose content about 20% compared with about 71% in normal whey powder) on the one hand, and whey powder with about 71% lactose, on the other hand.

Potato puree was made from "Desiree"-potatoes, having a starch content of 13.2% and a solids content of 19.8% according to the process described by R. K. Eskew in "Potato Processing", Chapter 13 ("Potato Processing" by William F. Talburt and Ora Smith, The AVI Publishing Company, Inc., Westport, Connecticut, 1967).

To one each of three 10 kg portions of potato puree there were added, respectively:

(A) 110 g whey protein powder (lactose-poor, about 18 to 20% lactose)
($\approx$5.5% based on potato solids, $\approx$5% based on total composition)
80 g NaCl (sodium chloride)
15 g monoglycerides
(B) 110 g whey powder ($\approx$5.5% based on potato solids, $\approx$5% based on total composition)
80 g NaCl
15 g monoglycerides (According to Webb, U.S. Pat. No. 2,185,451, who has about 5.5 to 95% non-fat milk solids based on potato solids as his percentages given, these solids constitute 5-48% based on the total composition.)
(C) 1900 g whey powder (95%, based on potato solids, 48% based on total composition)
80 g NaCl
15 g monoglycerides (According to Webb, U.S. Pat. No. 2,185,451).

The resulting three potato puree mixtures were then individually dried on a laboratory type drum drier (roll drier) to provide potato flakes.

To reconstitute the samples A, B and C, 95 g portions of each sample were stirred into 500 ml water just at the boiling point. The resulting purees were tested by a board of five people, who usually test the production of applicants' company. The rating was done as described in Example 11.

The results of the ratings show the following table.

TABLE VI

| Sample | Ratings | | | |
|---|---|---|---|---|
| | Color | Odor | Taste | Consistency |
| A | 7 | 7 | 7 | 7 |
| B | 6 | 6 | 6 | 7 |
| C | 4 | 4 | 3 | 1 (soup, no puree) |

To get a puree consistency in Sample C the product must be used in an amount of 160 g instead of 95 g or the amount of water used for reconstitution must be reduced to 320 ml. Color, odor and taste of such a puree were 4, 4 and 3 respectively with a consistency of 5 (sticky), i.e. not acceptable.

The above Table VI shows that sample A received the best ratings in all criteria.

Sample B was lower in color (greyish yellow), odor and taste, and Sample C was totally unacceptable for its brownish color and its odor and taste, which do not resemble a potato puree at all.

Six months later portions of Samples A, B, C, which had been stored at 20° C. (under nitrogen), were again tested under the same conditions as above.

The rating was as follows:

TABLE VII

| | Color | Odor | Taste | Consistency |
|---|---|---|---|---|
| A (invention) | 7 | 7 | 7 | 7 |
| B (lower limit of Webb) | 6 | 6 | 5 | 6 (consistency sticky) |
| C (upper limit of Webb) | 4 | 3 | 3 | 1 (soup, no puree) |
| C used in an amount of 160 g instead of 95 g with 500 ml water: | 4 | 3 | 3 | 4 (sticky) |

After a storage of 20° C. of another four months (total storage time ten months) portions from samples A, B and C were again tested under the above mentioned conditions.

The rating was as follows:

TABLE VIII

| | Color | Odor | Taste | Consistency |
|---|---|---|---|---|
| A (invention) | 7 | 7 | 7 | 7 |
| B (lower limit of Webb) | 5 | 5 | 5 | 5 (sticky) |
| C (upper limit of Webb | 3 | 3 | 2 | 1 (soup, no puree) |
| C used in an amount of 160 g instead of 95 g with 500 ml water: | 3 | 3 | 2 | 4 (sticky) |

If a puree has a rating of 5 in only 1 of the 4 criteria rated here in 2 succeeding ratings (ratings are done every hour in the production plant) it is considered unfit for marketing.

If a puree has a rating of 3 or less in only one of the four above criteria it is considered as deteriorated and unfit for food purposes.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly equitably, and "intended" to be, within the full range of equivalence of the following claims.

What is claimed is:

1. In a process for the preparation of a reconstitutable potato puree in dried flake form including the steps of washing, peeling, slicing, precooking, cooling, cooking, forming a puree of the cooked potato, and drying the puree on a drum dryer, the improvement which comprises:
homogeneously dispersing in the puree, prior to said drying, an aqueous suspension containing 2-12% by weight, based on dried potato solids, of a water-soluble protein material selected from the group consisting of egg albumin and lactose-poor whey protein, said suspension having a solids content of about 9 to 45% by weight.

2. A process in accordance with claim 1, wherein said water-soluble protein material is lactose-poor whey protein and wherein said lactose-poor whey protein is prepared by precipitation from or ultrafiltration of whey and consists essentially of the albumin and globulin fractions from milk.

3. The process of claim 1 including the step of adding to said puree at least one ingredient selected from the group consisting of an emulsifier, whole milk, and skim milk.

4. The process of claim 3 wherein the emulsifier is a monoglyceride.

5. The process of claim 4 wherein said monoglyceride is used in an amount of about 0.5 to about 5% based on the weight of dry potato solids.

6. The process of claim 3 wherein whole milk or skim milk is added as an aqueous suspension having a solids content of about 9 to about 45% by weight.

7. The process of claim 1 wherein the protein material is sprayed into the puree of cooked potatoes and is then homogeneously dispersed therein.

8. The process of claim 7 wherein the protein material is added as an aqueous suspension having a solids content of about 20 to about 45% by weight.

9. The process of claim 7 wherein the protein material is added as an aqueous suspension having a solids content of about 40% by weight.

10. The process of claim 7 including the step, preliminary to pre-cooking, of treating the potatoes at a temperature of about 55° C. for about 20 minutes.

11. The process of claim 7 wherein the potatoes have a starch content of about 15 to about 17% and are pre-cooked for a period of about 10 minutes at about 70° C.

12. The process of claim 1 including the step, preliminary to pre-cooking, of treating the potatoes at a temperature of about 45° to about 60° C. for about 15 to about 60 minutes.

13. The process of claim 1 wherein the potatoes have a starch content of about 13 to about 20%.

14. The process of claim 13 wherein the potatoes are pre-cooked for a period of about 5 to about 20 minutes at a temperature of about 65° C. to about 85° C.

15. The process of claim 1 wherein the aqueous suspension is sprayed into the sump of the fourth (downstream) roll of a conventional five roll drier.

16. A reconstitutable dried puree of cooked potato and from about 2 to about 12% by weight, based on dry potato solids, of added normally water soluble protein material selected from the group consisting of egg albumin and lactose-poor whey protein.

17. A dried puree as claimed in claim 16 wherein said normally water soluble whey protein material is lactose-poor whey protein and wherein said lactose-poor whey protein is prepared by precipitation from or ultrafiltration of whey and consists essentially of the albumin and globulin fractions from milk.

18. The dried puree of claim 17 wherein the amount of said protein material is about 4 to about 8% by weight, based on dry potato solids.

19. A dried puree as claimed in claim 17 and also containing an emulsifying-effective amount of a monoglyceride.

20. A dried puree as claimed in claim 17 and also containing whole milk or skim milk.

21. The dried puree of claim 17 comprising about 4 to about 8% by weight of said protein material based on dry potato solids, and also containing an emulsifying-effective amount of a monoglyceride, and either whole milk or skim milk.

22. A reconstitutable dried flake form of potato derived from a puree of cooked potato and, containing from about 2 to 12% by weight, based on dry potato solids, of lactose-poor whey protein.

23. In a reconstitutable dried flake, cooked, potato puree, the improvement comprising 2-12% by weight, based on dried potato solids, of a lactose-poor whey protein substantially free of casein and containing no more than 25% lactose, homogeneously incorporated into said dried flake potato puree.

24. A dried flake puree in accordance with claim 23 further comprising 0.6-0.8% monoglyceride based on dried potato solids.

* * * * *